United States Patent Office 3,548,298
Patented Dec. 15, 1970

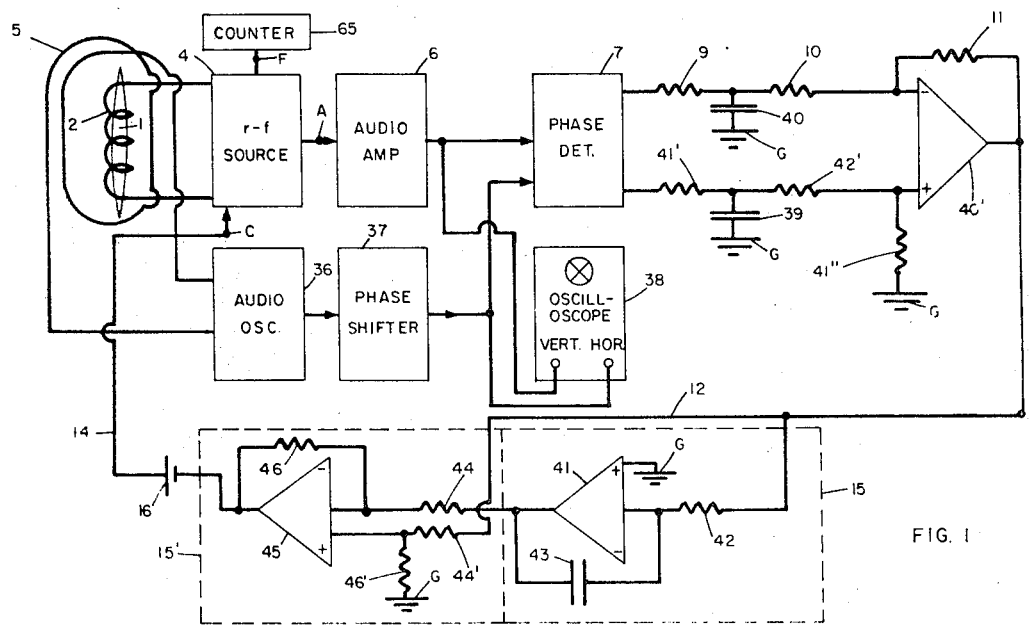

3,548,298
TRANSISTORIZED NUCLEAR MAGNETIC RESONANCE GAUSSMETER
Michael S. Adler, Cambridge, Mass., assignor to Massachusetts Institute of Technology, Cambridge, Mass., a corporation of Massachusetts
Filed May 17, 1968, Ser. No. 730,080
Int. Cl. G01r 33/08
U.S. Cl. 324—.5                                 11 Claims

ABSTRACT OF THE DISCLOSURE

A transistorized nuclear magnetic resonance (NMR) gaussmeter in which a material (as doped water) containing nuclei whose resonance frequency is proportional to the strength of an ambient D-C magnetic field is subjected to a radio frequency (R-F) electromagnetic field at the resonance frequency. The frequency of the applied field is counted and related to the magnitude of the D-C magnetic field by the relationship $f = \gamma_g/2\pi \cdot H$ where: $f$ is the frequency of the applied field in mHz., $\gamma_g$ is the gyromagnetic ratio ($\gamma_g/2\pi = 4.2576$ for protons), and $H$ is the magnitude of the D-C magnetic field in kilogauss. The frequency of the R-F field is controlled by a single voltage variable capacitance tightly coupled in the limited oscillator circuit of the R-F source. The D-C field is modulated at an audio frequency and the periodic variations of the resonance frequency thereby effected about a center frequency are used to create an error signal when the center frequency and the frequency of the applied R-F field are not identical. The error signal is fed back to the voltage variable capacitance along a first direct feedback path to provide fast correction and along a second path having operational amplifier means to integrate the error signal and feed the integrated signal across the voltage variable capacitance thereby to reduce the error signal to zero.

---

The invention herein described was made in the course of a contract with the Navy, Office of Naval Research.

The present invention relates to a gaussmeter in which the nuclear magnetic resonance of a sample is used as a basis for determining the magnitude of an ambient D-C magnetic field within which the sample is located.

In an article entitled, "Magnetic Field-Tracking Nuclear Resonance Gaussmeter," Maki et al., The Review of Scientific Instruments, vol. 36, No. 3, March 1965, pp. 325–327, there is described a field locked gaussmeter for tracking variations of about 14 percent in a D-C magnetic field of the order of 3500 gauss. The apparatus therein described uses the nuclear magnetic resonance theory of the present invention and employs D-C field modulation and feedback to variable capacitance diodes to effect such tracking. A marginal oscillator serves as a source of radio frequency signals for determining the resonance frequency. The D-C field in connection with which the apparatus may be used is relatively low, and the range of magnetic field that can be measured is quite limited, as mentioned.

Accordingly, an object of the present invention is to provide a nuclear magnetic resonance lock-in gaussmeter that is useful in connection with the above-mentioned 3500 gauss D-C field, but which may be used to determine the magnitude of an ambient D-C magnetic field up to the order of 180,000 gauss and which can track variations in the field of about 70 percent.

Another object is to provide in such a gaussmeter switching means to enable use of one instrument to measure a number of different D-C magnetic field ranges.

Still another object is to provide a gaussmeter with transistorized circuitry thereby to allow ease of handling of the gaussmeter probe mechanism and to allow the incorporation of integrated circuits and other miniaturization techniques.

Since the probe of such a meter must be short compared to the quarter wavelength of the oscillator frequency to ensure satisfactory operation over a wide range of frequencies, the oscillator of necessity must be placed in or near the high D-C magnetic field; accordingly, a further object is to provide an oscillator circuit that is not detrimentally affected by high D-C magnetic fields.

A further object is to provide a small, compact gaussmeter that operates on far lower power requirements than do presently available devices.

A still further object is to provide a gaussmeter that reacts quickly to changes or variations in the ambient D-C magnetic field.

Other and still further objects will be evident in the specification to follow and will be particularly pointed out in the appended claims.

By way of summary the objects of the invention are attained in a lock-in nuclear magnetic resonance (NMR) gaussmeter in which a material containing nuclei whose resonance frequency is proportional to an ambient D-C magnetic field is subjected to a radio frequency electromagnetic field at the resonance frequency, and the D-C magnetic field is modulated at an audio frequency thereby to effect changes in the resonance frequency of the nuclei about a center frequency. Means is provided to detect periodic differences between the frequency of the applied electromagnetic field and the resonance frequency, as the resonance frequency changes about said center frequency, to create an error signal. The source of the electromagnetic field contains a tightly coupled voltage variable capacitance adapted to change the frequency of the source in response to voltage changes thereacross. Operational amplifier means connected across the voltage variable capacitance is adapted to receive and integrate the error signal and to apply the integrated signal across the voltage variable capacitance thereby to vary the source frequency to reduce the error signal to zero. A counter connected to the source determines the frequency thereof, and the frequency thus determined is a measure of the D-C magnetic field.

The invention will now be described in connection with the accompanying drawing in which:

FIG. 1 is a schematic circuit diagram of a preferred embodiment of the invention showing a number of the circuit elements in block diagram form;

FIG. 2 is a schematic circuit diagram showing details of the circuit elements between points labeled A, F, and C in FIG. 1;

FIG. 3 is a schematic circuit diagram of a modification of the circuit in FIG. 2 between points labeled C, M, and N in FIG. 2;

FIG. 4 is a plan view of a portable magnetic field probe embodying the concepts herein disclosed.

Before proceeding with a detailed explanation of the invention with reference to the drawing, it is in order to discuss, briefly, the overall concept upon which the invention rests. It is known, as discussed in the article, that certain materials have nuclei which can absorb energy at a characteristic or resonance frequency, and that the frequency of nuclear resonance of some such nuclei is proportional to the strength of an ambient D-C magnetic field, the resonance frequency increasing or decreasing respectively as the ambient field increases or decreases. On useful material for such purpose is water (the protons in the water being the nuclei which resonate); however, the line width of the proton resonance in pure water is quite narrow (⅓ Hz.) and, therefore, difficult to observe.

So, for present purposes, the water has added to it paramagnetic ions as, for example, manganese of dissolved manganese chloride, to widen the resonance line width. (A dopant level of about $10^{20}$ ions/cc. provides a line width of about $10^3$ Hz.) The resonance frequency of protons is about 51.3 mHz. in an ambient magnetic field of 12,000 gauss, the relationship between the D-C field and the resonance frequency being:

$$H = \frac{f}{(\gamma_g/2\pi)}$$

where H is the magnitude of D-C bias field in kilogauss, $f$ is the resonance frequency of the nuclei in mHz., and $\gamma_g$ is the gyromagnetic ratio ($\gamma_g/2\pi = 4.2576$ for protons). Thus, it is possible to measure the D-C field strength with great precision by determining the resonance frequency of the nuclei. One method of determining the resonance frequency is to subject the material to a suitably polarized, low-power, radio frequency magnetic field. For such purpose the material can be doped water, as mentioned, contained within an ampoule 1 in FIG. 1, and the applied radio frequency (R-F) field can be provided through a sample coil 2 substantially enveloping the material and oriented to provide a magnetic R-F field orthogonal in direction to the D-C field. When the frequencies coincide, maximum energy transfer from the applied field to the nuclei will occur; and appropriate instrumentation will provide an indication of such transfer. Any change in the D-C magnetic field will result in a change in the resonance frequency. The primary purpose of the present invention is to provide apparatus adapted to track or lock to the resonance frequency by having changes in resonance frequency effect like changes in the source of the applied R-F field, thereby to maintain the frequency of the applied R-F field equal to the nuclear resonance frequency; and, unlike the 14 percent change in field detectable in the apparatus described in the article (2 mHz. in 14.5 mHz.), the present device is suitable for tracking changes of the order of 70 percent. For example, one such device using the present concept has been used to track resonance frequency changes from 54.1 mHz. to 26.4 mHz. (or 70 percent about a center frequency of 40.5 mHz.) representing ambient field values from 12.7 kilogauss to 6.5 kilogauss respectively.

It is possible to change the frequency of the applied R-F field manually, but such manual operation requires adjustment of the gaussmeter every time a reading is made. The present apparatus, for reasons to be mentioned hereinafter, couples tightly to the resonance frequency of the nuclei to give an output frequency that at all times is equal to the resonance frequency. The tight coupling is accomplished by providing a limited oscillator, as the source of the applied R-F field shown at 4 in FIG. 1, in which a voltage variable capacitance, designated 3 in FIG. 2, is the dominant tuning element of a tank circuit 67 comprising the voltage variable capacitance 3 and the coil 2. Indeed, within the range of frequencies for which a particular voltage variable capacitance is capable of swinging the frequency of the R-F source 4, no manual adjustment is required, it being necessary, however, as later discussed, to provide different values of voltage variable capacitances for different D-C field ranges. The frequency of the R-F source can be counted using a counter 65 connected to said source at F.

Locking the applied R-F frequency to the resonance frequency is effected by modulating the D-C magnetic field, as by the use of Helmholtz coils 5 adapted to provide A-C magnetic fields oriented in a direction parallel to the D-C magnetic field thereby to effect periodic variations in the resonance frequency of the nuclei about a center frequency, the periodic variations being used to create an error signal (when the source frequency and the center frequency are not identical) which is fed back to the source 4 to effect coincidence of the two frequencies. If the D-C magnetic field is modulated at a frequency less than the linewidth of resonance and the amplitude of the modulation is of the order of the linewidth, the component at the modulation frequency of the audio output of the source 4 at A will be proportional to the first derivative of absorption line, the absorption line being a curve representing absorption of energy by the nuclei as the resonance frequency varies about the center frequency. The first derivative is zero when the applied R-F frequency and the center resonance frequency coincide but otherwise differs from zero. The output of the source 4 at A is fed to an audio amplifier 6 and thence to a phase detector 7 where the component of the amplified output at the modulation frequency is phase detected to create an error signal which is proportional to the difference between the R-F frequency and the center resonance frequency and is positive or negative in polarity, depending upon the phase of said first derivative.

The error signal is fed back through a first fast feedback loop including conductors 12 and 14, and an adder 15', where the signal in the first loop is added to a further signal, later described, the combined signal being fed through a D-C source 16 to the source 4 to present an error voltage across the voltage variable capacitance 3 which, in turn, attempts to change the frequency of the source 4 in response to the voltage changes thereacross. The first feedback loop provides a short response time of the order of 50 microseconds to introduce a correction which tends to reduce the frequency error, that is, a difference between the applied R-F frequency and the center nuclear resonance frequency. The dynamic range of this fast feedback loop is of the order of 30 percent of the ambient field, which is much greater than the first feedback loop of said article, and can for this reason track wider and faster D-C magnetic field fluctuations than the device therein described. However, the first feedback loop cannot reduce the error signal to zero.

To reduce the error signal to zero, it is fed back also along a second feedback path including an integrator 15, and the resulting signal (which is an integral of the error signal) is combined with the fast feedback signal in the adder 15', as before mentioned, the combined signal being fed to the voltage variable capacitance 3. It is the integrated portion of the combined signal that reduces any error signal to zero. The second feedback loop has a slower response time, of the order of 0.1 second, but it has a dynamic range that is limited only by the range of the voltage variable capacitance and the range of voltage swing of operational amplifiers 41 and 45. By feeding the combined signal to a single tightly coupled voltage variable capacitance 3, both the fast response to changes in the D-C magnetic field and the wide tracking range are achieved.

As discussed in greater detail hereinafter, the oscillator 4 is a limited oscillator comprising, as particularly shown in FIG. 2, first and second transistors 18 and 19, respectively, each having base leads 21, and 51, respectively, emitter leads 24 and 25, respectively, and collector leads 47 and 23, respectively. One side of the tank circuit 67 which comprises the reverse bias diode 3, the coil 2, and a coupling capacitance 20, is connected to the base 21 of the first transistor 18. The first transistor stage provides amplification. Limiting and regeneration for the oscillator 4 are provided by the second transistor stage through a feedback resistor 22.

In a wide tracking NMR gaussmeter, the voltage variable capacitance must change over a large range to allow the oscillator frequency to track the nuclear magnetic resonance frequency. Accompanying this large capacitance change is a large change in loading by the voltage variable capacitance; and, for the gaussmeter to function properly, the oscillator must continue to operate stably over the range despite the loading change. It is in order now to explain the characteristics of the limited oscillator circuit that have been found to render the limited oscillator better than the marginal oscillator for present purposes.

A limited oscillator differs from a marginal oscillator in apparatus of the type herein described in that response of the limited oscillator to nuclear magnetic resonance absorption remains constant and stable over a wide range of loading of the tuned circuit 67 whereas the marginal oscillator, with increased loading, becomes increasingly unstable up to a point where it abruptly stops oscillating. These effects in the marginal oscillator stem from differences in the functional dependence of the R-F feedback current on the R-F level of the tuned circuit. The limited oscillator derives its name from the fact that the feedback current in the coupling resistance 22 is "hard limited," i.e., is independent of the tuned circuit voltage. In a limited oscillator circuit: $\Delta V_{NMR} = I_{fB} \cdot \Delta G_{NMR}$, where $\Delta V_{NMR}$ is the change in the voltage level across the tank circuit 67 due to nuclear magnetic response absorption, $I_{fB}$ is the R-F feedback current through the resistance 22, and $\Delta G_{NMR}$ is the change in the conductance of the tank circuit 67, again due to the nuclear magnetic resonance absorption. Since $I_{fB}$ is independent of loading, in a well designed limited oscillator circuit, there results a constancy and stability of response of the oscillator to the nuclear magnetic resonance absorption over a large range of nuclear magnetic resonance frequencies virtually independent of the loading of the tuned circuit 67.

In a marginal oscillator, on the other hand, the feedback current is "soft limited," i.e., related to the tuned circuit voltage by the power series $$I_{fB}' = g'V - g''V^3$$

where $g'$ and $g''$ are expansion coefficients of the power series for the R-F feedback current $I_{fB}'$ about its operating point, and $V$ is the tuned circuit voltage. This results in rapid changes in the response and stability of the response in marginal oscillators as a function of the loading of the tuned circuit with the result that oscillations cease after a critical amount of loading. This is, in fact, where the name marginal oscillator arose, since the oscillator is designed to be on the verge of oscillation and any extreme change in loading will drive it out of oscillation.

As mentioned, the material within the ampoule 1 may be water doped with manganese chloride. The resonance frequency of such material increases with the ambient D-C magnetic field to a value at which, even using the high frequency transistor devices of the present invention, sensitivity becomes a problem. Higher frequencies than the 54.1 mHz. mentioned can be detected by circuitry improvement techniques adapted to improve sensitivity, but at some point other means are necessary to enable readings of D-C fields above about 30,000 gauss. It is possible, for example, to provide a material such as lithium which has a resonance frequency low enough to allow readings up to 70,000 gauss, or to provide heavy water ($D_2O$) which again has a lower nuclear resonance frequency than the proton nuclei to allow readings, of sufficiently uniform fields, up to about 180,000 gauss.

In FIG. 3 there is shown circuitry adapted to enable readings of different D-C magnetic field ranges by providing a plurality of different-valued voltage variable capacitances 27, 28, 29, etc., with switches 30, 31, 32, etc., respectively, to connect an appropriately-valued voltage variable capacitance, as 27, in the tank circuit 67 to provide an indication of the magnitude of D-C magnetic field in a particular range and to change to another value of voltage variable capacitance, as 28, to indicate another range.

The transistorized circuitry herein disclosed allows the incorporation of integrated circuits and other miniaturization techniques in the gaussmeter described; thus, the R-F source 4 and audio amplifier 6 can be contained within the enclosure shown at 34 of a portable unit 34' in FIG. 4, the R-F frequency being fed to a probe 33 housing the sample coil 2, the ampoule 1, and the Helmholtz coils 5. Signals to and from the portable unit 34' are fed through a cable 35. A number of the other circuit elements shown in FIG. 1 can also be housed in the enclosure 34 by appropriate miniaturization. Since, as previously discussed, the probe 33 of the meter must be short (of the order of six to eight inches) for the high frequency uses for which the present device is primarily intended to ensure satisfactory operation over a wide range of frequencies, the oscillator 4 must of necessity be placed in or near the high D-C magnetic field being monitored. The transistorized circuitry of the present invention which is not detrimentally affected by the high magnetic field, is, therefore, well suited for present purposes. Furthermore, a gaussmeter built in accordance with the principles herein disclosed is small and compact and requires less power to operate than hitherto known devices; and accuracies of the order of one part per million or better are obtained.

In FIG. 1, the audio frequency signal to the Helmholtz coils 5 is provided by an audio oscillator 36, the output of said audio oscillator being fed also to a phase shifter 37 which in turn passes the phase shifted audio output to the detector 7 to provide a reference signal in said detector. The output of the phase shifter 37 is fed also to the horizontal connection of an oscilloscope 38, the vertical connection of which is connected to receive the output of the audio amplifier 6. The oscilloscope thus connected displays a curve of energy absorbed by the sample coil 2 as a function of the modulation field provided by the Helmholtz coils 5.

The feedback path includes, in addition to the previously discussed elements, a low-pass filter consisting of capacitances 39 and 40 and resistances 9, 10, 41', and 42'. The error signal from the phase detector is amplified by an operational amplifier 40' and the resistances 11 and 41", which together form a balance-to-unbalance amplifier; and it is the amplified signal in the disclosed embodiment that passes along the first and second feedback paths. The integrator 15 comprises a series resistance 42, capacitance 43, and the operational amplifier 41 serially connected to the adder 15' comprising resistances 44, 44', 46 and 46' and the operational amplifier 45.

In FIG. 2 the R-F source 4 includes, in addition to the circuit elements already described, a source of plus voltage (+) and a source of minus voltage (—) connected to Zener diodes 50 and 62, respectively, through resistances 48 and 61, respectively, to provide constant positive and negative bias voltages to the oscillator. A biasing network for the two transistor stages consists of resistances 49, 54, and 54' for the first transistor 18, and resistances 58, 59, and 52 for the second transistor 19. A potentiometer 60 is connected to the Zener diode 62, the negative supply voltage (—), and the resistance 59 to control the level of oscillation. The capacitances shown at 53, 55, 56, 64, and 66 are R-F bypass capacitors. The R-F signal to the frequency counter 65 is fed through an isolating resistance 53'. An audio output from the R-F source 4 is fed through a coupling capacitance 57 to the point A and thence to the audio amplifier 6 as previously discussed. The feedback and bias voltages to the voltage variable capacitance 3 are fed through a resistance 63. A capacitance 26 serves to couple the emitters 24 and 25 of the transistors 18 and 19, respectively. In the circuits shown a number of the elements are connected to ground G, ground being intended herein to denote a chassis connection as well as actual earthing.

In an operational circuit for use at the 54.1 mHz. frequency previously discussed, the transistor 18 is biased at 5.0 milliamps and the transistor 19 at 0.5 milliamps. In the operational circuit the circuit elements listed below have the values given in parentheses: capacitance 20 (200 pf.), resistance 63 (100,000Ω), capacitance 64 (0.001 pf.), resistances 9, 10, 42, and 43 (47,000Ω), capacitances 39 and 40 (15 μf.), resistance 42 (100,000Ω), resistances 46 and 46' (22,000Ω), resistances 44 and 44' (18,000Ω), resistance 22 (3,300Ω), and capacitance 43 (2 μf.).

What is claimed is:

1. A lock-in nuclear magnetic resonance gaussmeter comprising, in combination, a material containing nuclei whose resonance frequency is proportional to an ambient D-C magnetic field, limited oscillator source means for establishing a radio frequency electromagnetic field at the resonance frequency in the region occupied by the material, the source of the electromagnetic field containing a tightly coupled voltage variable capacitance adapted to change the frequency of the source in response to voltage changes thereacross, the voltage variable capacitance being the dominant tuning element of the source, means for modulating the D-C magnetic field at an audio frequency thereby to effect periodic variations in the resonance frequency of the nuclei about a center frequency, means to detect any differences between the frequency of the applied electromagnetic field and the center frequency as the resonance frequency varies periodically about said center frequency to create an error signal, operational amplifier means connected across the voltage variable capacitance adapted to receive and integrate the error signal and to apply the integrated signal across the voltage variable capacitance thereby to vary the source frequency to reduce the error signal to zero, and counter means to determine the frequency of the radio frequency source.

2. A gaussmeter as claimed in claim 1 in which the counter means is scaled to indicate the magnitude of the D-C magnetic field, the D-C magnetic field being related to the source frequency by the relationship:

$$H = \frac{f}{(\gamma_g/2\pi)}$$

3. A gaussmeter as claimed in claim 1 in which the electromagnetic field establishing means includes a sample coil that envelops at least a portion of the material and in which the sample coil and the voltage variable capacitance are the dominant elements of a tank circuit which determines the frequency of the field.

4. A gaussmeter as claimed in claim 3 in which the source of the radio frequency field comprises a transistorized limited oscillator circuit.

5. A gaussmeter as claimed in claim 4 in which the source of the electromagnetic field comprises an oscillator circuit having first and second transistors each having base, emitter and collector terminals, one side of the tank circuit being connected to the base of the first transistor and through resistance coupling to the collector of the second transistor, the emitters of the first and second transistors being capacitively coupled.

6. A gaussmeter as claimed in claim 3 in which the voltage variable capacitance is the only tuning capacitance element in the tank circuit.

7. Apparatus as claimed in claim 6 comprising a plurality of different-valued voltage variable capacitances with means for connecting an appropriately-valued voltage variable capacitance into the circuit to provide an indication of the magnetic field in a particular range and to change to another value of voltage variable capacitance to indicate another range.

8. A gaussmeter as claimed in claim 1 in which the error signal is detected and fed back through a first feedback loop having a short response time directly to the voltage variable capacitance to provide fast changes in the frequency of said source and in which the error signal is integrated by said operational amplifier integrator, the resulting signal being fed back to the voltage variable capacitance to reduce the error signal to zero, the voltage variable capacitance being the dominant tuning element of the source.

9. A gaussmeter as claimed in claim 1 in which the means for modulating the D-C magnetic field comprises Helmholtz coils oriented to provide a magnetic field parallel to the direction of said D-C magnetic field and adapted to be energized by an audio frequency oscillator, and in which the magnetic field of the radio frequency source is oriented in a direction orthogonal to said D-C magnetic field.

10. A gaussmeter as claimed in claim 9 in which the output from the audio frequency oscillator is fed to a phase shifter and the output of the phase shifter is fed to the detector means.

11. A lock-in nuclear magnetic resonance gaussmeter comprising, in combination, a material containing nuclei whose resonance frequency is proportional to an ambient D-C magnetic field, limited oscillator source means for establishing a radio frequency electromagnetic field at the resonance frequency in the region occupied by the material, the source of the electromagnetic field containing a single tightly coupled voltage variable capacitance adapted to change the frequency of the source in response to voltage changes thereacross, the voltage variable capacitance being the dominant tuning element of the source, means for modulating the D-C magnetic field at an audio frequency thereby to effect periodic variations in the resonance frequency of the nuclei about a center frequency, means to detect any differences between the frequency of the applied electromagnetic field and the center frequency as the resonance frequency varies periodically about said center frequency to create an error signal, a first fast feedback loop having a short response time connected to feed the error signal back to the voltage variable capacitance to provide fast changes in the frequency of the source, operational amplifier means connected to receive and adapted to integrate the error signal, the error signal carried by the first feedback loop and the integrated signal being combined and the combined signal being fed to present an error voltage across the voltage variable capacitance, and counter means connected to determine the frequency of the radio frequency source.

References Cited

UNITED STATES PATENTS 3,153,201  10/1964  Knight _____ 324—0.5

OTHER REFERENCES

A. H. Maki and R. J. Volpicelli, Magnetic Field Tracking Nuclear Resonance Gaussmeter, Rev. of Sci. Instr.— 36(3) March, 1965 pp. 325–327.

J. R. DeHaas, D. Van Ormondt, and C. Slotze, A Simple Field Tracking Magnetometer For The Range, 2000–4500 Oe., Journal of Sci. Instr. 44, June 1967, pp. 471–472.

RUDOLPH V. ROLINEC, Primary Examiner

M. J. LYNCH, Assistant Examiner